United States Patent [19]

Tsumura

[11] Patent Number: 5,511,097
[45] Date of Patent: Apr. 23, 1996

[54] DELAY DETECTION CIRCUIT

[75] Inventor: Soichi Tsumura, Tokyo, Japan

[73] Assignee: NEC Corporation, Japan

[21] Appl. No.: 176,349

[22] Filed: Dec. 30, 1993

[30] Foreign Application Priority Data

Jan. 8, 1993 [JP] Japan .................. 5-001961

[51] Int. Cl.⁶ .................................... H04L 27/14
[52] U.S. Cl. .......................... 375/324; 375/329; 375/334;
329/300; 329/304; 455/214
[58] Field of Search ................. 375/80, 83, 84,
375/88, 89, 93, 97, 324–326, 329, 330,
334, 335, 344, 272, 279; 329/300, 301,
304, 310, 306; 455/214, 255, 263, 265

[56] References Cited

U.S. PATENT DOCUMENTS

| | | | |
|---|---|---|---|
| 5,049,830 | 9/1991 | Yoshida | 375/83 |
| 5,056,122 | 10/1991 | Price | 375/80 |
| 5,228,062 | 7/1993 | Bingham | 375/97 |
| 5,260,975 | 11/1993 | Saito | 375/83 X |
| 5,287,067 | 2/1994 | Denno et al. | 375/80 X |
| 5,299,231 | 3/1994 | Guglielmi et al. | 375/83 X |

FOREIGN PATENT DOCUMENTS

| | | |
|---|---|---|
| 140440 | 10/1984 | European Pat. Off. . |
| 449146 | 3/1991 | European Pat. Off. . |
| 498704 | 1/1992 | European Pat. Off. . |

Primary Examiner—Stephen Chin
Assistant Examiner—Amanda T. Le
Attorney, Agent, or Firm—Ostrolenk, Faber, Gerb & Soffen

[57] ABSTRACT

This delay detection circuit receives a digital-phase-modulated signal including an already-known preset symbol string and an unknown data symbol string following the already-known string, and detects a phase difference between an instantaneous phase of a reception signal and an instantaneous phase after a preset symbol time from the time of the reception signal received using a phase difference detector. Then, the delay detection circuit calculates a compensation phase difference necessary to demodulate the reception signal from the phase difference, the phase difference of demodulation symbol estimated from the already-known symbol string and the phase difference of demodulation symbol estimated from the data symbol string, and demodulate the reception signal based on the compensation phase difference.

15 Claims, 3 Drawing Sheets

DELAY DETECTION CIRCUIT

BACKGROUND OF THE INVENTION

The present invention relates to a delay detection circuit used for PSK (Phase Shift Keying) and FSK (Frequency Shift Keying).

Conventionally, a carrier regenerative system using a narrow-band filter, for example, that detects a phase difference from a demodulation output by synchronous detection, controls a phase of a regenerative carrier based on the phase difference, and compensates the phase difference of the regenerative carrier caused by a frequency deviation is known as shown in Japanese Patent Laid-Open No. 61-117957(1986).

However, this system has a disadvantage in the field where its receiver must be miniaturized by integration, especially in the field of mobile communications, because the system needs a phase shifter.

On the other hand, comparing this synchronous detection system, a latest delay detection system that demodulates a digital-phase-modulated carrier is considered to be fit to use for mobile communications because burst frame efficiency and error rate characteristic under Rayleigh fading (where probability distribution of a received power is approximated to a Rayleigh distribution when many multiple waves interfere with each other at random) thereof are better than that.

The delay detection system, however, has a defect that its deterioration of error rate tends to be remarkable if a frequency shift occurs by transmission frequency drift, etc. The reason of this phenomenon is that a receiver detects the frequency shift as a phase rotation of normal reception phase difference.

For solving this problem, a delay detection circuit to compensate the frequency shift is proposed. The delay detection circuit shown in FIG. 3, for example, detects, in a modulator 31, an ideal phase difference 303 of a demodulation symbol 302 estimated in a demodulator 30. Then, it estimates a phase compensation quantity 304 by calculating a moving average of a difference between a reception phase difference 301 and the ideal phase difference 303 using a phase compensation quantity estimator 32, obtains a compensation phase difference 305 by compensating a frequency offset of a frequency shift based on the phase compensation quantity 304 using an adder 33, feedbacks this compensation phase difference 305 to the demodulator 30.

However, such a delay detection circuit has some problems, such as a reception signal performed by frequency offset is apt to be regarded as a noise and an instantaneous frequency offset quantity is misdetected because a reception symbol is not detected correctly if a phase rotation by frequency offset goes over 45°. As a result, constant and correct compensation of reception signal can not be performed.

To solve these problems, a delay detection circuit to compensate frequency offset is also proposed. This delay detection circuit, shown in FIG. 4 as an example, detects a specific pattern from demodulation symbols 401 using a detector 40, simultaneously outputs an ideal phase difference 402 of the specific pattern. Besides this, it estimates a phase compensation quantity 404 in a phase compensation quantity estimator 41 by averaging differences of the ideal phase difference 402 and a reception phase difference 403 delayed in a specific number of patterns in a delay circuit 42, compensates a frequency offset to obtain a compensation phase difference 405 in an adder 43 based on the phase compensation quantity 404, feedbacks the compensation phase difference 405 to a demodulator 44.

Generally, when a receiver asynchronously receives a burst signal, an already-known symbol such as a preamble is sent in a specific pattern for a relatively long time interval earlier than a data signal that is sent as information. On the other hand, if it becomes synchronous status, the transmission time interval becomes relatively short for increasing burst frame efficiency.

Additionally, when a burst signal is received using the delay detection circuit shown in FIG. 4, there is a defect that a frequency offset can not be compensated if the already-known specific pattern can not be recognized. For example, if it is needed to asynchronously receive a burst signal in a condition that error rate is high, the error rate may be deteriorated further by frequency offset. In such a case, compensation may need longer time, since the initial specific pattern is difficult to be detected.

Also, if the transmission time of the specific pattern even in a synchronous status, this delay detection circuit may not detect a correct compensation quantity because it can not fully average an instantaneous phase compensation quantity to be detected. This means that a conventional delay detection circuit can not rapidly and fully perform phase compensation. More, there is a problem that the reception error rate of this delay detection circuit can not be improved fully when frequency offset is performed.

SUMMARY OF THE INVENTION

The present invention is done to solve the above problems and the technical task thereof is to offer a delay detection circuit whose error rate is low and enables rapidly, stably and correctly performed phase compensation.

An object of the present invention is achieved by a delay detection circuit that receives a reception signal string comprising a first reception signal resultant from digital-phase-modulation of an already-known preset symbol string and a second reception signal resultant from digital-phase-modulation of an unknown data symbol string following said already-known symbol string, performs delay-detection using said reception signal string; comprising:

a reception phase difference detector means for detecting a reception phase difference between a first instantaneous phase of a reception signal in said reception signal string and a second instantaneous phase of another reception signal after a preset symbol time from said reception signal;

a compensation phase difference calculator means for calculating a compensation phase difference necessary to demodulate said reception signal string using said reception phase difference, a first phase difference equivalent to an already-known symbol in said already-known symbol string and a second phase difference equivalent to an unknown data symbol in said unknown data symbol string; and a demodulation means for demodulating said reception signal string based on said compensation phase difference.

More, it is desirable that said phase difference detector means comprises:

a first instantaneous phase detector means for detecting said first instantaneous phase;

a second instantaneous phase detector means for detecting said second instantaneous phase; and a reception phase difference calculator means for calculating said reception phase difference between said first instantaneous phase and said second instantaneous.

More, it is desirable that said preset time is one symbol time.

More, said compensation phase difference calculator means comprises:

a first compensation phase difference calculator means for calculating a first compensation phase quantity using said first phase difference and a first reception phase difference obtained at receiving said first reception signal string that is a part of said reception phase difference and calculating a first compensation phase difference using said first compensation phase quantity; and a second compensation phase difference calculator means for calculating a second compensation phase quantity using said first compensation phase quantity, said second phase difference and a second reception phase difference obtained at receiving said second reception signal string that is a part of said reception phase difference and calculating a second compensation phase difference using said second compensation phase quantity.

More, it is desirable that said first compensation phase difference calculator means comprises:

a first compensation phase quantity calculator means for calculating said first compensation phase quantity from said first phase difference and said first reception phase difference; and a first adder means for adding said first reception phase difference and said first compensation phase quantity, and outputting a first compensation phase difference.

More, it is desirable that said first compensation phase quantity calculator means calculates a first compensation phase quantity by calculating a first difference between said first reception phase difference and said first phase difference, accumulating said first difference in a preset times and calculating an average thereof.

More, it is desirable that said second compensation phase difference calculator means comprises:

a second compensation phase quantity calculator means for calculating a second compensation phase quantity from said first compensation phase quantity, said second reception phase difference and said second phase difference; and a second adder means for adding said second reception phase difference and said second compensation phase quantity, and outputting a second compensation phase difference.

More, it is desirable that said second compensation phase quantity calculator means calculates a second compensation phase quantity by calculating a sum of said first compensation phase quantity and said second reception phase difference, calculating a second difference between said second phase difference and said sum, accumulating said second difference in a preset times and calculating an average thereof.

More, it is desirable that said demodulation means comprises, when receiving said first reception signal string, to detect a phase difference nearest to said first compensation phase difference among phase differences representing respective already-known symbols in said already-known symbol string, and perform digital-phase-demodulation using this detected phase difference.

More, it is desirable that the delay detection comprises a convertor means for converting a symbol obtained by demodulation to a phase difference thereof.

Further the object of the present invention is achieved by a delay detection circuit that receives a digital-phase-modulated reception signal, performs delay-detection and outputs demodulation result, comprising:

a phase difference detector means for detecting a phase difference between an instantaneous phase of said reception signal and an instantaneous phase after a preset symbol time from said instantaneous phase of said reception signal;

a plurality of dummy phase compensation quantity generator means, each dummy phase compensation quantity generator means for generating a dummy phase compensation quantity;

a plurality of dummy phase error calculator means, each dummy phase difference calculator means for adding said dummy phase compensation quantity and said phase difference and calculating a dummy phase difference;

a plurality of dummy demodulation symbol demodulation means, each dummy demodulation symbol demodulation means for demodulating a dummy demodulation symbol based on said dummy phase difference;

a plurality of convertor means, each convertor means for converting said dummy demodulation symbol to an ideal phase difference of this dummy demodulation symbol;

a plurality of phase difference error calculator means, each phase difference error calculator means for calculating a phase difference error between said dummy phase difference and said ideal phase difference of said dummy demodulation symbol; and a decision means for detecting a smallest difference from said differences, selecting a dummy demodulation symbol corresponding to this smallest difference from said dummy demodulation symbols, and outputting this dummy demodulation symbol as a demodulation symbol.

More, it is desirable that said phase difference detector means comprises:

a first instantaneous phase detector means for detecting said first instantaneous phase;

a second instantaneous phase detector means for detecting said second instantaneous phase; and a reception phase difference calculator means for calculating said reception phase difference between said first instantaneous phase and said second instantaneous.

More, it is desirable that said preset time is one symbol time.

More, it is desirable that said phase difference error calculator means comprises to accumulate said calculated phase difference in a preset times, calculate of an average of these accumulated phase differences and output a result of this calculation as a real phase difference.

Further more, it is desirable that the delay detection circuit, that receives a reception signal string comprising a first reception signal resultant from digital-phase-modulation of an already-known preset symbol string and a second reception signal resultant from digital-phase-modulation of an unknown data symbol string following said already-known symbol string, performs delay-detection using said reception signal string; wherein said demodulation means comprises, when receiving said first reception signal string, to detect a phase difference nearest to said first compensation phase difference among phase differences representing respective already-known symbols in said already-known symbol string, and perform digital-phase-demodulation using this detected phase difference.

Additionally, when it is known in advance that an already known symbol having enough length such as a preamble signal at asynchronously receiving a synchronous burst reception, the delay detection circuit of the present invention enables to reduce a probability of an error by frequency offset or noise so on at estimating a demodulation symbol and to estimate in short time the quantity for compensation, because it performs estimation in presupposition that reception is done using an already-known symbol string. Also, when a transmission symbol string is unknown and unestimatable like at normal burst reception in a synchronous condition, the delay detection circuit of the present invention estimates a transmission symbol from a reception phase difference not in presupposition to receive a specific transmission symbol, fully calculating an average of difference of the reception phase difference and an ideal phase difference in which the estimated symbol to be output. By this operation, it can continue to estimate correct phase compensation quantities, so that it also can perform rapid and sufficient phase compensation. As the result, an error of reception at frequency offset is fully improved.

DESCRIPTION OF THE INVENTION

Figure 1:
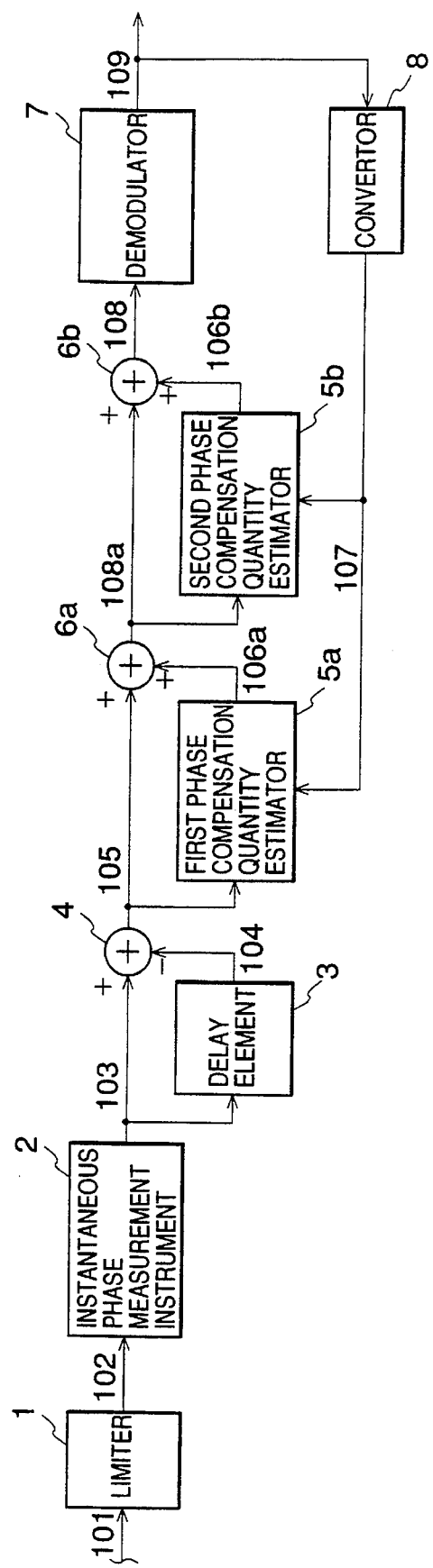
FIG. 1 illustrates a block diagram of an embodiment of the present invention.

Referring to the drawings, embodiments of a delay detection circuit of the present invention are explained in detail.

FIG. 1 illustrates a block diagram of an embodiment of a delay detection circuit of the present invention.

In this figure, 1 is a limiter comprising to limit a carrier band of a reception signal 101 that is digital-phase-modulated and output a limiter output signal 102.

2 is a first instantaneous phase detector means, such as an instantaneous phase measurement instrument which measures an instantaneous phase from the limiter output signal 102 at a symbol timing and output an instantaneous phase signal 103.

3 is a second instantaneous phase detecting means, such as a delay element which delays the instantaneous phase signal 103 for one symbol time and output a one symbol delay instantaneous phase difference signal 104.

4 is a subtracter comprising to calculate a reception phase difference at one symbol time between the instantaneous phase signal 103 and one symbol delay instantaneous phase difference signal 104 and output a reception phase difference signal 105.

Where, the instantaneous phase measurement instrument 2, the delay element 3 and the subtracter 4 work as a phase difference detection means to detect a phase difference between an instantaneous phase and an instantaneous phase before one symbol time of the instantaneous phase.

5a is a first phase compensation quantity estimator comprising to estimate an instantaneous phase compensation quantity using a phase difference signal 107 indicating an ideal phase difference of a demodulation symbol signal 109 having been output from a convertor 8 described later and the reception phase difference signal 105 and calculate an average thereof, and output an tentative phase compensation quantity signal 106a.

6a is a first adder comprising to add the reception phase difference signal 105 and the tentative phase compensation quantity signal 106a and output a tentative compensation phase difference signal 108a.

5b is a second phase compensation quantity estimator comprising to estimate an instantaneous phase compensation quantity using the phase difference signal 107 indicating an ideal phase difference of the demodulation symbol signal 109 having been output from the convertor 8 and the tentative compensation phase difference signal 108a and calculate an average thereof, and output an phase compensation quantity signal 106b.

6b is a second adder comprising to add the tentative compensation phase difference signal 108a and the phase compensation quantity signal 106b and output a compensation phase difference signal 108.

Where, the first phase compensation quantity estimator 5a and the first adder 6a work as a first compensation phase difference calculator means calculating a first compensation phase difference when receiving an already-known symbol string.

More, the second phase compensation quantity estimator 5b and the second adder 6b work as a second compensation phase difference calculator means calculating a second compensation phase difference when receiving an unknown data symbol.

7 is a demodulator comprising, when receiving an already-known symbol string, to detect a phase difference nearest to the compensation phase difference signal 108 from ideal phase differences of already-known symbol string and demodulate the demodulation symbol signal 109 using the detected phase difference. More, when receiving a data symbol string, it comprises to detect a phase difference nearest to the compensation phase difference signal 108 from ideal phase differences of all transmission symbols and demodulate the demodulation symbol signal 109 using this phase difference.

8 is a convertor comprising to convert the demodulation symbol signal 109 input therein to an phase difference signal 107 indicating an ideal phase difference of the demodulation symbol signal 109. Then, it outputs the phase difference signal 107 to the phase compensation quantity estimator 5a and the phase compensation quantity estimator 5b.

Next, a receiving operation of a delay detection circuit configured as above is explained.

In this embodiment, it is to be noted that the case of receiving a digital-phase-modulated reception signal, as a burst, including an unknown data symbol string following a already-known preset symbol string is assumed.

Firstly, at an initial status, that is, at receiving a already-known preset symbol string, the reception signal 101 is input to the limiter 1. The limiter 1 limits the carrier band of the reception signal 101 and outputs the limiter output signal 102.

Then, the limiter output signal 102 is input to the instantaneous phase measurement instrument 2, the instantaneous phase measurement instrument 2 measures an instantaneous phase of the limiter output signal 102 at a symbol timing and outputs the instantaneous phase signal 103 to the delay element 3 and the subtracter 4.

The delay element 3 supplied the instantaneous phase signal 103 delays the instantaneous phase signal 103 for one symbol time and outputs a one symbol delay instantaneous phase difference signal 104 to the subtracter 4.

The subtracter 4 calculates a reception phase difference at one symbol time from the input instantaneous phase signal 103 and the one symbol delay instantaneous phase difference signal 104 and outputs the reception phase difference signal 105.

At this initial status, it is to be noted that the tentative phase compensation quantity signal 106a that is an output of the phase compensation quantity estimator 5a and the phase compensation quantity signal 106b that is an output of the phase compensation quantity estimator 5b are reset to zero, and the compensation phase difference signal 108 is equal to the reception phase difference signal 105.

At this initial status, the phase compensation quantity estimator 5a estimates a difference using the ideal phase difference signal 107 of the demodulation symbol signal 109 that is output from the convertor 8 and the reception phase difference 105 described above, and outputs the tentative phase compensation quantity signal 106a by accumulating a preset number of the instantaneous phase compensation quantities and calculating an average thereof.

In this case, the phase compensation quantity of the tentative phase compensation quantity signal 106a can be estimated in a short time and at a high reliability, since the transmission symbol has an already-known symbol. Additionally, the reason is that, for example, if supposing that a preamble of a synchronous burst of a digital cordless telephone is the already-known symbol, the minimum inter-symbol distance is twice compared with the minimum inter-symbol distance of all transmission symbol, so that the probability that the demodulation symbol signal 109 may be an error is greatly reduced and the small number of the instantaneous phase compensation quantity is enough to be averaged.

Next, in a status that a transmission burst including an already-known symbol of a sufficient length has been completed such as in a case that the burst transmission status is a normal synchronous status, estimation of phase compensation quantity has been completed, the adder 6a has added the reception phase difference signal 105 and the tentative phase compensation quantity signal 106a and output the calculated tentative compensation phase difference signal 108a.

At this moment, the compensation phase difference signal 108 and the tentative compensation phase difference signal 108a are same because the phase compensation quantity signal 106b in the phase compensation quantity estimator 5b is reset to zero.

Then, at this status, the demodulator 7 detects a phase difference nearest to the compensation phase difference signal 108 from the ideal phase differences of all transmission symbols, demodulates the demodulation symbol signal 109 using this phase difference.

On the other hand, when reception of an unknown data symbol string starts, the phase compensation quantity estimator 5b estimates a difference based on the phase difference signal 107 and the tentative compensation phase difference signal 108a, outputs the phase compensation quantity signal 106b by accumulating a preset number of the instantaneous phase compensation quantity and calculating an average thereof.

Where, it can be considered that the frequency offset values between continuous transmission bursts are same because the speed of the transmission frequency drift is generally slow enough against the transmission burst cycle.

Therefore, the tentative compensation phase difference signal 108a correctly compensates the frequency offset at this moment, so that the demodulation symbol 109 is correct.

This is a reason that the phase compensation quantity signal 106b estimated from the tentative compensation phase difference signal 108a and the phase difference signal 107 has a high reliability and it is possible to correctly and continuously compensate the frequency offset value varied little by little at each transmission burst after currently receiving burst by the frequency drift.

As a result, the system can demodulate the demodulation symbol signal 109 of which error rate is low using the compensation phase difference signal 108 from which influences of frequency offset have been removed.

Next, the second embodiment of the present invention is explained.

Figure 2:
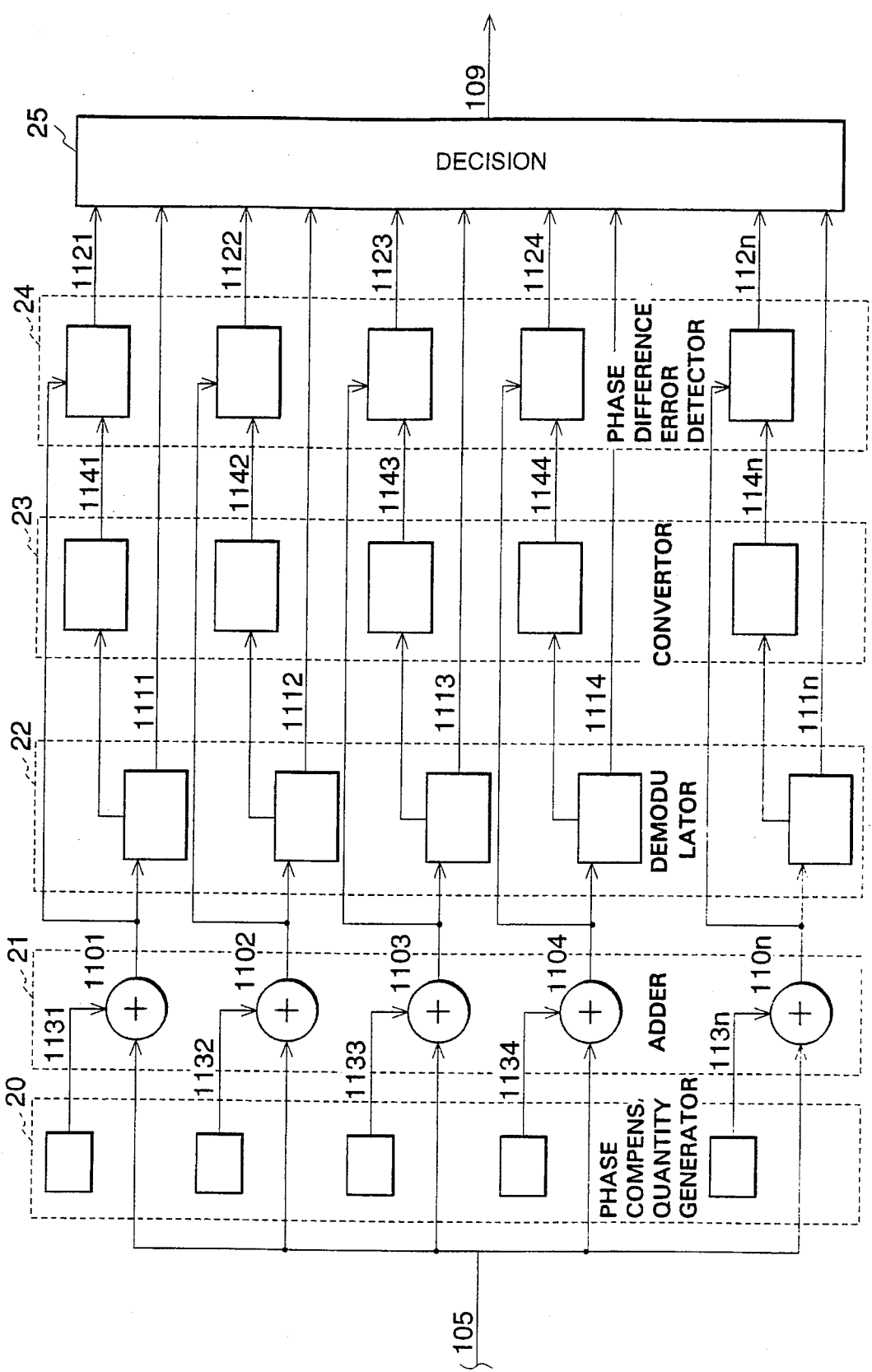
FIG. 2 illustrates a block diagram of another embodiment of the present invention.
Figure 3:
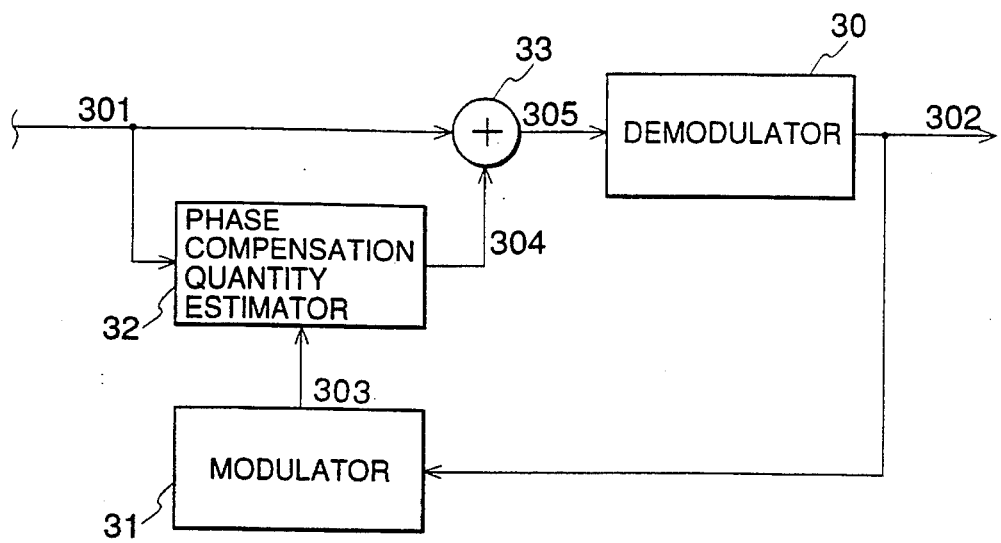
FIG. 3 illustrates a block diagram of a delay detection circuit of a prior art.
Figure 4:
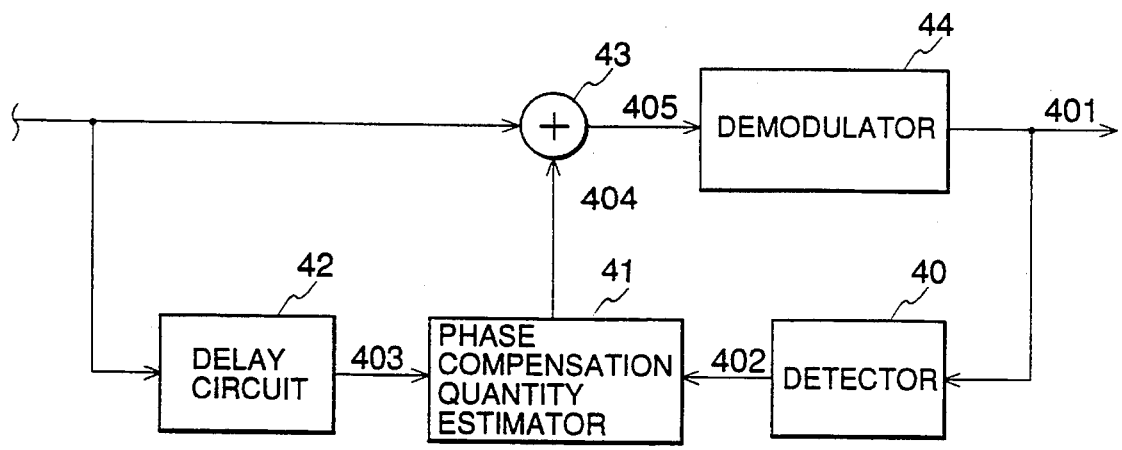
FIG. 4 illustrates another delay detection circuit of a prior art.

FIG. 2 illustrates a block diagram of another embodiment of the present invention.

In this embodiment, the circuitry up to obtain the reception phase difference signal 105 is configured similarly to the first embodiment. That is, the delay detection circuit shown in FIG. 2 also has a limiter 1, an instantaneous phase measurement instrument 2, a delay element 3 and a subtracter 4, but the explanation on the circuitries is omitted.

20 is a phase compensation quantity generator comprising to generate a plurality of dummy phase compensation quantity signals 1131 to 113n, and it works as a dummy phase compensation quantity generator means.

21 is an adder comprising to add a plurality of dummy phase compensation quantity signals 1131 to 113n and the reception phase difference signal 105 and calculate a plurality of dummy compensation phase difference signals 1101 to 110n, and it works as a dummy phase difference calculating means.

22 is a demodulator comprising to demodulate a plurality of dummy demodulation symbol signals 1111 to 111n corresponding to a plurality of dummy compensation phase difference signals 1111 to 111n, and it works as a dummy demodulation symbol demodulator means.

23 is a convertor comprising to convert a plurality of dummy demodulation symbol signals 1111 to 111n to phase difference signals 1141 to 114n indicating ideal phase differences of the dummy demodulation symbol signals 1111 to 111n, and it works as a convertor means.

24 is a phase difference error detector comprising to output a plurality of phase difference error signals 1121 to 112n based on a plurality of dummy compensation phase difference signals 1101 to 110n and a plurality of phase difference error signals 1141 to 114n, and it work as a phase difference error calculator means.

25 is a decision means comprising to receive a plurality of dummy demodulation symbol signals 1111 to 111n and a plurality of phase difference error signals 1121 to 112n, detect a smallest one from the phase difference error signals 1121 to 112n, select a demodulation symbol corresponding to the smallest phase difference error signal from dummy demodulation symbol signals 1111 to 111n and output the dummy demodulation symbol signal as a dummy demodulation symbol signal 109, and it works as a decision means.

Next, receiving operation of this embodiment is explained.

Firstly, the reception phase difference signal 105 and dummy phase compensation quantity signals 1131 to 113n are input to the adder 21. The adder 21 adds both signals in each adder element and outputs dummy compensation phase difference signals 1101 to 110n.

Then, the demodulator 22 demodulates dummy demodulation symbol signals 1111 to 111n nearest to the phase difference indicated by the input dummy phase compensation difference signals 1101 to 110n.

Subsequently, the convertor 23 converts the phase difference signals 1141 to 114n indicating ideal phase differences of the dummy demodulation symbol signals 1111 to 111n.

The phase difference error detector 24 calculates an instantaneous phase difference error based on the dummy compensation phase difference signals 1101 to 110n and the phase difference signals 1141 to 114n. Then, it outputs the phase difference error signals 1121 to 112n by accumulating a preset number of calculated instantaneous phase difference errors and calculating an average of accumulated instantaneous phase difference error.

The decision means 25 receives the dummy demodulation symbol signals 1111 to 111n and the phase difference error signals 1121 to 112n, detects smallest one from the phase difference error signals 1121 to 112n, selects a demodulation signal corresponding to the smallest phase difference error from the dummy demodulation symbol signals 1111 to 111n and outputs the dummy demodulation symbol signal as the demodulation symbol signal 109.

In this embodiment, the dummy phase compensation quantity signals 1131 to 113n output from the dummy phase compensation quantity generator 20 necessarily includes a correct phase compensation quantity, so that the reliability of the dummy demodulation symbol signal demodulated based on the phase compensation quantity is high.

As a result, phase difference error becomes small and it is possible to specify a correct demodulation symbol.

More, in this embodiment, when receiving a digital-phase-modulated reception signal including an unknown data symbol string following an already-known symbol string as a burst, it is possible to prepare in advance a dummy demodulation symbol corresponding to the already-known symbol string and output a dummy demodulation symbol corresponding to the input dummy compensation phase difference signal.

What is claimed is:

1. A delay detection circuit that receives a reception signal resulting from digital-phase-modulation of an already-known symbol string and an unknown data symbol string following said already-known symbol string, comprising;

a reception phase difference detector means for detecting a reception phase difference between an instantaneous phase of said reception signal and an instantaneous phase of another reception signal before a preset symbol time from said reception signal;

a first compensation phase difference calculator means for calculating a first phase difference between said reception phase difference obtained at receiving said already-known symbol and an ideal phase difference of said already-known symbol and calculating a first compensation phase difference based on said reception phase difference and said first phase difference;

a second compensation phase difference calculator means for calculating a second phase difference between said first compensation phase difference and an ideal phase difference of said unknown data symbol and calculating a second compensation phase difference based on said first compensation phase difference and said second phase difference; and a demodulation means for demodulating said reception signal based on said second compensation phase difference.

2. The delay detection circuit of claim 1, wherein said phase difference detector means comprises:

a first instantaneous phase detector means for detecting said instantaneous phase of said reception signal;

a second instantaneous phase detector means for detecting said instantaneous phase of said another reception signal; and a reception phase difference calculator means for calculating said reception phase difference between said instantaneous phase of said reception signal and said instantaneous phase of said another reception signal.

3. The delay detection circuit of claim 1, wherein said preset time is one symbol time.

4. The delay detection circuit of claim 1, wherein said first compensation phase difference calculator means comprises:

a first compensation phase quantity calculator means for calculating a first compensation phase quantity from said first phase difference and said reception phase difference; and a first adder means for calculating said first compensation phase difference adding said reception phase difference and said first compensation phase quantity, and for outputting said first compensation phase difference.

5. The delay detection circuit of claim 4, wherein said first compensation phase quantity calculator means calculates said first compensation phase quantity by calculating a first difference between said reception phase difference and said first phase difference, accumulating said first difference in a preset times and calculating an average thereof.

6. The delay detection circuit of claim 1, wherein said second compensation phase difference calculator means comprises:

a second compensation phase quantity calculator means for calculating a second compensation phase quantity from said first compensation phase quantity, said reception phase difference and said second phase difference; and a second adder means for calculating said compensation phase difference adding said reception phase difference and said second compensation phase quantity, and for outputting said second compensation phase difference.

7. The delay detection circuit of claim 6, wherein said second compensation phase quantity calculator means calculates a second compensation phase quantity by calculating a sum of said first compensation phase quantity and said second reception phase difference, calculating a second difference between said second phase difference and said sum, accumulating said second difference in a preset times and calculating an average thereof.

8. The delay detection circuit of claim 1, wherein said demodulation means comprises, when receiving said reception signal, to detect a phase difference nearest to said first compensation phase difference among phase differences representing respective already-known symbols in said already-known symbol string, and perform digital-phase-demodulation using this detected phase difference.

9. The delay detection circuit of claim 1, comprising a convertor means for converting a symbol obtained by demodulation to a phase difference thereof.

10. A delay detection circuit that receives a digital-phase-modulated reception signal, performs delay-detection and outputs demodulation result, comprising:

a phase difference detector means for detecting a phase difference between a first instantaneous phase of said reception signal and a second instantaneous phase before a preset symbol time from said instantaneous phase of said reception signal;

a plurality of dummy phase compensation quantity generator means, each dummy phase compensation quantity generator means for generating a dummy phase compensation quantity;

a plurality of dummy phase error calculator means, each dummy phase error calculator means for adding said dummy phase compensation quantity and said phase difference and calculating a dummy phase difference;

a plurality of dummy demodulation symbol demodulation means, each dummy demodulation symbol demodulation means for demodulating a dummy demodulation symbol based on said dummy phase difference;

a plurality of convertor means, each convertor means for converting said dummy demodulation symbol to an ideal phase difference of said dummy demodulation symbol;

a plurality of phase difference error calculator means, each phase difference error calculator means for calculating a phase difference error between said dummy phase difference and said ideal phase difference of said dummy demodulation symbol; and a decision means for detecting a smallest difference from phase difference errors, selecting a dummy demodulation symbol corresponding to said smallest difference from said dummy demodulation symbols, and outputting this dummy demodulation symbol as a demodulation symbol.

11. The delay detection circuit of claim 10, wherein said phase difference detector means comprises:

a first instantaneous phase detector means for detecting said first instantaneous phase;

a second instantaneous phase detector means for detecting said second instantaneous phase; and a reception phase difference calculator means for calculating said reception phase difference between said first instantaneous phase and said second instantaneous.

12. The delay detection circuit of claim 10, wherein said preset time is one symbol time.

13. The delay detection circuit of claim 10, wherein said phase difference error calculator means comprises means to accumulate said calculated phase difference in a preset times, means to calculate an average of these accumulated phase differences and means to output a result of this calculation as a real phase difference.

14. The delay detection circuit of claim 10, wherein when receiving a reception signal comprising an already-known symbol string and an unknown data symbol string following said already-known symbol string, delay-detecting said reception signal, said dummy demodulation symbol demodulation means detects a phase difference nearest to said dummy phase difference among ideal phase differences of already-known symbols, and digital-phase-demodulates using said detected phase difference when receiving said already-known symbol string.

15. The delay detection circuit of claim 10, wherein when receiving a reception signal comprising an already-known symbol string and unknown data symbol string following said already-known symbol string, delay-detecting said reception signal, said dummy demodulation symbol demodulation means prepares in advance dummy demodulation symbols corresponding to already-known symbols of said already-known symbol string, detects a dummy demodulation symbol nearest to said input dummy compensation phase difference signal among said prepared dummy demodulation symbols and outputs said detected dummy demodulation symbol when receiving said reception signal.

\* \* \* \* \*